United States Patent [19]

Sekmakas et al.

[11] 4,285,844

[45] Aug. 25, 1981

[54] AQUEOUS COATINGS BASED ON COPOLYMERS WITH A MIXTURE OF POLYMERIC POLYOL AND BISPHENOL-PROPYLENE OXIDE ADDUCT

[75] Inventors: Kazys Sekmakas, Palatine; Raj Shah, Schaumburg, both of Ill.

[73] Assignee: DeSoto, Inc., Des Plaines, Ill.

[21] Appl. No.: 111,077

[22] Filed: Jan. 10, 1980

[51] Int. Cl.³ .............................................. C08L 33/06
[52] U.S. Cl. ......................... 260/23 EP; 260/29.6 NR
[58] Field of Search .................. 260/23 EP, 29.6 NR, 260/29.6 E

[56] References Cited

U.S. PATENT DOCUMENTS

| 2,596,737 | 5/1952 | Tess | 260/23 EP |
| 2,877,195 | 3/1959 | McNabb | 260/23 EP |
| 3,308,077 | 3/1967 | Pattison | 260/29.6 NR |
| 3,506,601 | 4/1970 | Sekmakas | 260/29.6 E |

Primary Examiner—Paul R. Michl
Attorney, Agent, or Firm—Dressler, Goldsmith, Shore, Sutker & Milnamow, Ltd.

[57] ABSTRACT

A low temperature-curing aqueous coating composition contains an acidic solution copolymer of monoethylenically unsaturated monomers, including about 2% to about 20% of carboxyl-functional monomer based on the weight of the copolymer, with a mixture of ethylenically unsaturated esters of ethylenically unsaturated fatty acids with organic solvent soluble and water insoluble polymeric polyol and water insoluble bisphenol-propylene oxide adduct polyol. Cure is preferably obtained using aminoplast or phenoplast curing agents, and the curing temperature is further lowered because the copolymer includes residual unsaturation providing an air dry capacity.

8 Claims, No Drawings

AQUEOUS COATINGS BASED ON COPOLYMERS WITH A MIXTURE OF POLYMERIC POLYOL AND BISPHENOL-PROPYLENE OXIDE ADDUCT

CROSS REFERENCE TO RELATED APPLICATION

This application is related to our prior copending application Ser. No. 960,310 filed Nov. 13, 1978 which discloses a different species of this invention.

TECHNICAL FIELD

This invention relates to low temperature-curing aqueous coating compositions and to acidic copolymers of monoethylenic monomers with a mixture of unsaturated esters which are dispersible in water with the aid of a base.

BACKGROUND ART

Aqueous coating compositions containing acidic copolymers of monoethylenically unsaturated monomers with unsaturated epoxy resin esters, preferably together with aminoplast or phenoplast curing agents are known, as illustrated by U.S. Pat. Nos. 3,536,641, 4,145,323 and 4,151,131. Our said prior application is based on the addition of a water soluble bisphenol polyol to form a mixed ester which increases the solids content and reduces the viscosity of the aqueous coatings, but the properties are subject to improvement. It is known in said U.S. Pat. No. 3,536,641 to have glycols present during esterification, especially bisphenol A, but the reduction of solids and viscosity is excessive. The problem is to maximize desired film properties with minimum reduction in the solids content and viscosity.

DISCLOSURE OF INVENTION

In accordance with this invention, a low temperature curing aqueous coating composition comprises water having dispersed therein with a volatile base, an acidic solution copolymer of monoethylenically unsaturated monomers, including about 2% to about 20% of carboxylfunctional monomer based on the weight of the copolymer, with a mixture of ethylenically unsaturated esters of ethylenically unsaturated fatty acids with organic solvent soluble and water insoluble polymeric polyol and water insoluble bisphenol-propylene oxide adduct polyol. There is a total of more than two moles of unsaturated fatty acid per mol of polymeric polyol, and the bisphenol-ethylene oxide polyol constitutes from 10% to 125% of the weight of the polymeric polyol. Cure is preferably obtained using from 3% to 40%, based on total resin solids, of a curing agent selected from aminoplast and phenoplast curing agents, and the curing temperature is further lowered because the copolymer includes residual unsaturation evidenced by the capacity for air drying.

The organic solvent soluble, water insoluble, polymeric polyols contemplated in this invention possess esterifiable hydroxyl groups or hydroxyl group precursers such as 1,2-oxirane groups. These polymers include, but are not limited to, copolymers of styrene and allyl alcohol, copolymers of hydroxyethyl methacrylate, hydroxyethyl acrylate or glycidyl methacrylate. Hydrolyzed polyvinyl acetate can be used as well as polyesters containing residual hydroxyl functionality. Bisphenol-based polyethers having epoxide terminal groups are preferred. All of these materials are well known in the art and many are easily available in commerce. The glycidyl ethers of bisphenol will be used herein as illustrative because they are readily available and possess a bisphenolic backbone which confers good properties, but it will be understood that the ester product contains no oxirane functionality, so this preferred starting material is considered to fairly illustrate the specified class. These polymeric polyols are normally synthetic and resinous.

The preferred bisphenol-based polyethers have a 1,2-epoxy equivalency of from about 1.4 to about 2.0, and most preferably about 1.8 to 2.0. These polymers are therefore diepoxides or include diepoxides in admixture with monoepoxides. Higher functional polyepoxides are also useful, but less readily available and more costly. The average molecular weight of these polymers can range from about 350 to about 4000. These molecular weights are calculated from the epoxide equivalent weights.

It is particularly preferred to employ an epichlorohydrin-bisphenol A reaction product having an average molecular weight of about 800 to about 3000, and a diglycidyl ether of bisphenol A having an epoxide equivalent weight of about 900 and an average molecular weight of about 1800 is most preferred. These include several secondary hydroxyl groups, and more of such groups are generated when the oxirane groups are consumed.

The water insoluble bisphenol-propylene oxide adduct polyols are simple adducts of a bisphenol with 1,2-propylene oxide. A bisphenol denotes a pair of phenolic groups joined by an interconnecting divalent aliphatic group. The usual bisphenol compound is bisphenol A in which the phenolic hydroxy groups are in the para position to the divalent moiety which joins the two phenolic groups. Propylene oxide adduction is a well known reaction and it only adds a small number of alkylene oxide groups to provide a water insoluble product. The resulting polyol is useful herein in an amount of from about 10% to about 125%, based on the weight of the water insoluble polymeric polyol, preferably from 30% to 100% on the same basis.

The water insoluble polymeric polyol and the water insoluble bisphenol-propylene oxide adduct are esterified with ethylenically unsaturated fatty acids which normally contain from 8 to 22 carbon atoms, preferably from 10 to 18 carbon atoms per molecule. More than two mols of unsaturated fatty acid are used per mol of polymeric polyol. When this polyol contains oxirane functionality, it preferentially consumes the fatty acid in the formation of an hydroxy ester, and enough fatty acid must be used to consume all of the epoxy groups. At least a part of the excess will react with the primary hydroxy groups of the water insoluble bisphenol polyol. It is particularly preferred that two types of ethylenically unsaturated, monocarboxylic acids be used, one type having conjugated ethylenic unsaturation, and the second type having nonterminal, nonconjugated ethylenic unsaturation.

The polymeric polyol and the insoluble bisphenol polyol may be esterified separately with a mixture of the two types of ethylenically unsaturated fatty acids, separately with one type of fatty acid and then the other, or in any other fashion. Preferably, the polymeric polyol and bisphenol polyol are mixed and esterified simultaneously with both ethylenically unsaturated fatty acid types in one reaction mixture. It will be understood that a mixture of several species will result.

The reaction of the polymeric polyol with the single carboxyl group of the fatty acid is a conventional reaction which is assisted by the presence of a small amount of a basic esterification catalyst which is normally an amine. Both epoxy groups and hydroxy groups are esterified. The formation of epoxy esters and the production of soluble copolymers therefrom is shown in U.S. Pat. No. 2,877,195. However, that patent does not contemplate a subsequent copolymerization in the presence of an unsaturated bisphenol polyol ester as disclosed herein. Esterification of secondary hydroxyl groups, such as those of the bisphenol polyol, takes place under the same conditions as for the hydroxyl groups of the polymeric polyol, so esterification of the bisphenol polyol can be carried out along with esterification of the polyepoxide in a refluxing organic solvent, such as xylol, using an amine esterification catalyst and a means for eliminating the water produced, such as a Dean-Stark trap.

The fatty acid having conjugated ethylenic unsaturation enables the above resulting esters to be copolymerized with the terminal unsaturation in the monoethylenically unsaturated monomer discussed hereinbelow. These fatty acids will be illustrated herein by conjugated $C_{9-11}$ castor fatty acids which are a commercially available mixture of fatty acids which contain conjugated unsaturation at the 9 and 11 positions. Eleostearic acid, found in tung oil, and licanic acid, found in oiticica oil will further illustrate the conjugated fatty acids which are contemplated.

It is desired that subsequent copolymerization of the esters (described hereinbelow) with monomers (described hereinbelow) leave the resultant copolymer in an ungelled, organic solvent-soluble condition, and this means that the number of conjugated groups per molecule must be limited to avoid cross-linking which causes premature gelation. For this reason, the conjugated fatty acid is used in an amount to provide from about 0.05 (preferably at least about 0.08) to about 0.6 moles thereof per hydroxyl equivalent of all the polyols, including hydroxyl precursers such as epoxides. Preferred proportions are from about 0.1 to about 0.5 equivalents of conjugated fatty acid per hydroxyl equivalent in the mixture.

The nonterminal, nonconjugated ethylenically unsaturated monocarboxylic fatty acid is preferably present in about the same amount by weight as is the conjugated ethylenically unsaturated fatty acid, with not more than 100% molar excess of either fatty acid type over the other. The total amount of unsaturated fatty acid must be sufficient to be in stoichiometric excess with respect to any 1,2-epoxy functionality present and to esterify at least some of the hydroxyl groups which are present in or generated in the water insoluble polymeric polyol. The acid number of the ester product mixture should be below 40, and preferably below about 10 to minimize the proportion of free fatty acid.

Additionally, one can elect to include a proportion of saturated fatty acid such as lauric or myristic acids to reduce the overall unsaturation when a large number of ester groups is desired or when the polymeric polyol contains an hydroxy functionality in excess of about 10.

After synthesis of the mixture of unsaturated esters described hereinabove, the mixture is copolymerized in an organic solvent solution with monoethylenically unsaturated monomers. The monoethylenically unsaturated monomers will constitute from about 15% to about 120%, preferably from about 25% to about 65% based on the weight of the ester mixture. These monomers contain terminal unsaturation, and are desirably constituted by a mixture of monomers including carboxyl-functional monomer. Optionally present is a monomer having a primary hydroxyl group. In preferred practice a portion of the monomers are nonreactive monomers. As is common knowledge, a nonreactive monomer only polymerizes through its ethylenic group and does not otherwise react under the contemplated conditions of polymerization and cure. This usually means that the single ethylenic group is the only functional group present.

The carboxyl-functional monomers are selected for solubility and capacity for copolymerization. Suitable acids are acrylic acid, methacrylic acid, fumaric acid and maleic acid. The number of carboxyl groups is not important, but one, as in acrylic acid, is preferred. Enough acid should be used to enable dispersion in water after neutralization, and this requires from about 2% to about 20% of the carboxyl-functional monomers based on the weight of the copolymer. In preferred practice one would use from about 3% to about 12% of the carboxylfunctional monomers, based on the weight of the copolymer.

The hydroxy-functional monomer is illustrated by hydroxyethyl acrylate, hydroxyethyl methacrylate or allyl alcohol which provide primary hydroxy groups for cure with the resin curing agent (discussed below). The presence of primary hydroxyl functionality in the copolymer chain further reduces the temperature at which the copolymer compositions of this invention cure. From about 0.5% to about 15%, preferably from 1% to 8% of the weight of the copolymer is desirably constituted by the hydroxyl monomer. It should be noted that the various polyol esters themselves may possess hydroxy groups, but these are normally secondary hydroxy groups which do not provide the low temperature cure desired herein.

The nonreactive monomers are best illustrated by styrene, but vinyl toluene may be used in its place. Less desirably, one can use methyl methacrylate, acrylonitrile, vinyl acetate, ethyl acrylate, butyl acrylate, or the like, alone or in admixture with one another. Styrene or vinyl toluene will preferably constitute the entirety of the nonreactive monomers since this provides a clear homogeneous copolymer which is hard to obtain when other nonreactive monomers are used.

The solution copolymerization is itself entirely conventional, the reaction taking place in the organic solvent medium using heat and a free radical polymerization catalyst, normally a blend of peroxides, such as ditertiarybutyl peroxide and cumene hydroperoxide. The solution polymerization does not consume all of the unsaturation when a mixture of fatty acids is used, and it is preferred to have a residual iodine value in the copolymer of at least about 40.

The resultant copolymer includes polymeric polyol ester and bisphenol polyol ester combined by the copolymerization of the monoethylenically unsaturated monomers. A branched structure is thought to be obtained, but a minor amount of cross-linking may also be present based on the probability that polyol molecules may react with more than one conjugated ethylenically unsaturated fatty acid molecule and that several conjugated groups may be combined in a single copolymer molecule. If cross-linking is present, there is not enough to cause gelation of the copolymer, and gelation is to be avoided as stated hereinabove.

The solvents used should be minimized and selected for miscibility with water in the amounts used. Ether alcohols, such as 2-butoxyethanol, exhibit good water miscibility, and ketones, such as methyl ethyl ketone, are also quite good. However, solvents with limited miscibility in water are also helpful, such as small amounts of butanol. The class of organic solvents which may be present when acidic resins are dispersed in water with the aid of a base is well known, and is not a feature of this invention, but alcoholic solvents are preferred. The presence of the bisphenol polyol and esters thereof helps to reduce the proportion of solvent which is needed.

The volatile base used to neutralize the copolymer acidity is subject to wide variation, but nitrogenous bases are preferred, these being well known for the purposes of solubilizing acidic resins to provide aqueous coatings. Amines or ammonia are particularly useful, tertiary amines being best. This invention will be illustrated using N,N-dimethylethanolamine, but selection of the base is not a feature of this invention.

Neutralization of the copolymer acidity may be partial or complete as needed for dispersion in water. Complete (100%) neutrualization is preferred herein, but normally 50-100% neutralization is adequate.

The initial solvent solution of neutralized copolymer is thinned with water until the water predominates. The final copolymer solids content can range from about 20% up, depending upon the coating thickness which is desired and the viscosity which can be tolerated for application. Flow coating constitutes a preferred application technique in this invention, but the invention is not so limited. Typical coatings are applied at about 30% to about 60% copolymer solids, and these can be pigmented or not as desired. Corrosion-resisting pigments, such as the conventional chromate pigments like strontium chromate and lead chromate may be used. For electrocoating, a copolymer solids content in the range of about 2% to about 20%, preferably about 5% to about 15% is employed.

When the coatings are dried and cured in air at room temperature, the oxidative cure with atmospheric oxygen gradually eliminates the solvent sensitivity of the film, and is complete in about 3 days. Regardless of whether cure is at room temperature or higher, driers, such as cobalt naphthenate, zirconium naphthenate, calcium naphthenate, or similar drier metal fatty acid salts may be used and are helpful, but these are not needed. The driers are used in an amount of about 0.3% to about 2%, based on the weight of the copolymer.

Preferably, the coating compositions of this invention are cured with aminoplast or phenoplast resin curing agents which are added to the aqueous acidic copolymer solution prior to application of the coating. The aminoplast and phenoplast resins which are useful herein may be of any character so long as they can be dissolved or stably dispersed in water containing the dissolved acidic copolymer. These resins provide methylol groups which are particularly reactive with the primary hydroxy groups and are used in an amount of from 5% to 50%, preferably from 25% to 45%, based on the total weight of resin solids.

Typical aminoplast resins, all of which are formaldehyde condensates, are urea-formaldehyde, hexamethoxymethyl melamine and water dispersible transethers thereof with ethanol or other lower alcohol, benzoguanamineformaldehyde and the like including acidic derivatives where the carboxyl groups assist solubilization in aqueous alkaline medium. Water soluble or dispersible phenolic resins (phenoplasts) are also useful, these being illustrated by the well-known nongelled alkaline condensates of phenol with excess formaldehyde known as "A" stage resols. Any of these formaldehyde condensates can be used alone or in any desired mixture thereof. The phenolic resins provide the most outstanding corrosion and detergent resistance, but they introduce color problems which limit utility to primers which will be overcoated with opaque topcoats. The phenolic resins also require higher baking temperature than the aminoplast resins, but this invention still serves to reduce the temperature which is needed.

The invention is illustrated in the following example All parts herein are by weight unless otherwise stated.

BEST MODE FOR CARRYING OUT THE INVENTION

Example 1

| Charge Composition (grams) |
| --- |
| 738 Diglycidyl ethers of bisphenol A having an average molecular weight of 1800 (Note 1) (0.82 equivalents) |
| 280 Conjugated $C_{9-11}$ castor fatty acids (1.0 equivalent) |
| 280 Tall oil fatty acids (1.0 equivalent) |
| 578 Water insoluble propoxylated bisphenol A containing about 2 mols of adducted 1,2-propylene oxide per mol of bisphenol A (see Note 2) Set Dean-Stark trap with xylol. Heat to melt the mixture and then add the following: |
| 2.7 Triethylamine |
| 65 Xylol Heat to about 185° C. and hold until an acid value of less than about 10 is reached. Cool and add the following: |

Note 1
The product Epon 1004, available from Shell Chemical Co. may be used.
Note 2
Polyol 565 (Dow Chemical Company) may be used.
1420 2-Butoxy ethanol
Premix the following monomers and catalysts and add over 3 hours at 125° C.:
810 styrene
54 Hydroxyethyl acrylate
158 Acrylic acid
41 Cumene hydroperoxide
13 Ditertiary butyl peroxide
23 Tertiary dodecyl mercaptan
Hold for 1 hour and finish as follows:
9 Cumene hydroperoxide - add and hold for 1 hour.
9 Cumene hydroperoxide - add and hold for 1 hour.

The product is an organic solvent solution having a Gardner-Holdt viscosity of $Z_1^+$, an acid value of 50.6 and a nonvolatile solids content of 62.8%. Upon addition of N,N-dimethylethanolamine to neturalize 100% of the acidity, the product is soluble in water.

The coating solution of this Example 1 cures upon baking at a temperture of 220° F. while without the adducted bisphenol-based polyol, the cure temperature would typically be at 260° F. which is significantly higher than that needed in this invention. However, and despite the lower curing temperature, excellent detergent resistance is obtained.

In comparison with the corresponding solution which does not include the polyol, the viscosity is significantly lower, while the solids content is significantly higher.

The improvement which is obtained is illustrated by a comparison with a control identified as Example 2 which is the same as Example 1, except the propoxylated bisphenol A is omitted. The Examples 1 and 2 polymer solutions which were compared had the following characteristics:

An Example 3 was also carried out using the ethylene oxide adduct as in Ser. No. 960,310.

|  | Ex. 1 | Ex. 2 | Ex. 3 |
|---|---|---|---|
| Nonvolatile Solids | 62.8% | 57% | 63.3% |
| Viscosity (Gardner-Holdt) | $Z_1^+$ | $Z_3-Z_4$ | Y-Z |
| Color (Gardner) | 3-4 | 3-4 | 3-4 |
| Acid Value | 50.6 | 51.6 | 45.6 |

The propylene oxide adduct lowered viscosity and increased solids content almost as well as the ethylene oxide adduct of the prior application in Example 3.

These solutions were formulated into aqueous coatings by grinding 200 parts of the polymer solution with 10 parts dimethyl ethanol amine and 215 parts titanium dioxide (DuPont R-902) to a North-Shore grind gauge reading of 6-6½. 454 parts of this grind are mixed with 127 parts of additional polymer solution, 128 parts of hexamethoxy methyl melamine, 28 parts of dimethyl ethanol amine and 328 parts of deionized water. The aqueous coating solutions so-prepared are coated upon zinc phosphate-treated steel panels and baked 20 minutes at 220° F. to provide smooth and glossy coatings.

The example 2 control showed lower gloss, it applied poorly and the cured film blistered after 48 hours of detergent testing which the other coatings passed. Example 1 was harder (4H) than the other two (3H) and it was just as impact resistant and glossy as Example 3. However, on 500 hours of salt spray testing, Example 1 was superior to Example 3.

The presence of residual unsaturation in Example 1 enabled an air dry cure as shown by the fact that an air dried coating hardened and became fingerprint-resistant after 1 day exposure of air. Measurement of residual unsaturation is difficult, so the precise extent of residual unsaturation is not a primary feature of this invention.

What is claimed is:

1. A low temperature-curing aqueous coating composition comprising water having dispersed therein with the aid of a volatile base, an acidic solution copolymer of:
   (1) monoethylenically unsaturated monomers, including about 2% to about 20% of carboxylfunctional monomer based on the weight of the copolymer; with
   (2) a mixture of ethylenically unsaturated esters of:
      (A) ethylenically unsaturated fatty acids with
         (B-1) organic solvent and water insoluble polymeric polyol and
         (B-2) water insoluble bisphenol-propylene oxide adduct polyol,
   there being a total of more than two moles of unsaturated fatty acid per mol of said polymeric polyol, and said bisphenol-propylene oxide polyol constituting from 10% to 125% of the weight of said polymeric polyol.

2. An aqueous coating composition as recited in claim 1 in which said water contains 5% to 50%, based on total resin solids, of a curing agent selected from aminoplast and phenoplast curing agents.

3. An aqueous coating composition as recited in claim 1 in which said copolymer includes residual unsaturation providing an iodine number of at least about 40.

4. An aqueous coating composition as recited in any one of claims 1-3 in which said carboxyl-functional monomers are present in an amount of from about 3% to about 12% of the weight of the copolymer and are selected from the group consisting of acrylic acid, methacrylic acid, fumaric acid, and maleic acid.

5. An aqueous coating composition as recited in claim 4 in which said bisphenol-propylene oxide polyol constitutes from 30% to 100% of the weight of said polymeric polyol.

6. An aqueous coating composition as recited in any one of claims 1-3 wherein said water insoluble, synthetic, polymeric polyol and said bisphenol-propylene oxide adduct polyol are both esterified with at least about 0.08 moles of conjugated ethylenically unsaturated monocarboxylic fatty acid and at least about 0.08 moles of nonterminal nonconjugated ethylenically unsaturated monocarboxylic fatty acid per hydroxyl equivalent of all the polyols, said fatty acids containing from 8 to 22 carbon atoms and being present in stoichiometric excess with respect to any 1,2-epoxide functionality to additionally react with at least some of the hydroxyl groups present.

7. An aqueous coating composition as recited in claim 6 wherein said water insoluble, synthetic polymeric polyol is comprised of a diglycidyl ether of a bisphenol having an average molecular weight of about 800 to about 3000 and said fatty acids are used in an amount of about 0.1 to about 0.5 equivalents of each of said fatty acids per hydroxyl equivalent of all the polyols.

8. An aqueous coating composition as recited in claim 6 in which hexamethoxymethyl melamine is the curing agent.

* * * * *

UNITED STATES PATENT AND TRADEMARK OFFICE
CERTIFICATE OF CORRECTION

PATENT NO. : 4,285,844
DATED : August 25, 1981
INVENTOR(S) : Kazys Sekmakas and Raj Shah It is certified that error appears in the above-identified patent and that said Letters Patent are hereby corrected as shown below:

Col. 1, line 42, "ylfunctional" should read --yl-functional--

Col. 4, line 23, "carboxylfunctional" should read --carboxyl-functional--

Col. 5, line 67, "zoguanamineformaldehyde" should read --zoguanamine-formaldehyde--

Col. 6, lines 35-38, notes 1 and 2 and the material which follows should be on the same line Col. 7, line 45, "carboxylfunctional" should read --carboxyl-functional--

Col. 8, line 1, after "solvent" insert --soluble--

Signed and Sealed this

Fifteenth Day of December 1981

|SEAL|

*Attest:*

*Attesting Officer*

GERALD J. MOSSINGHOFF
*Commissioner of Patents and Trademarks*